Jan. 4, 1966   G. G. PINNEY ETAL   3,226,915
HYDROGEN DIFFUSION UNIT
Filed Aug. 6, 1962   4 Sheets-Sheet 3

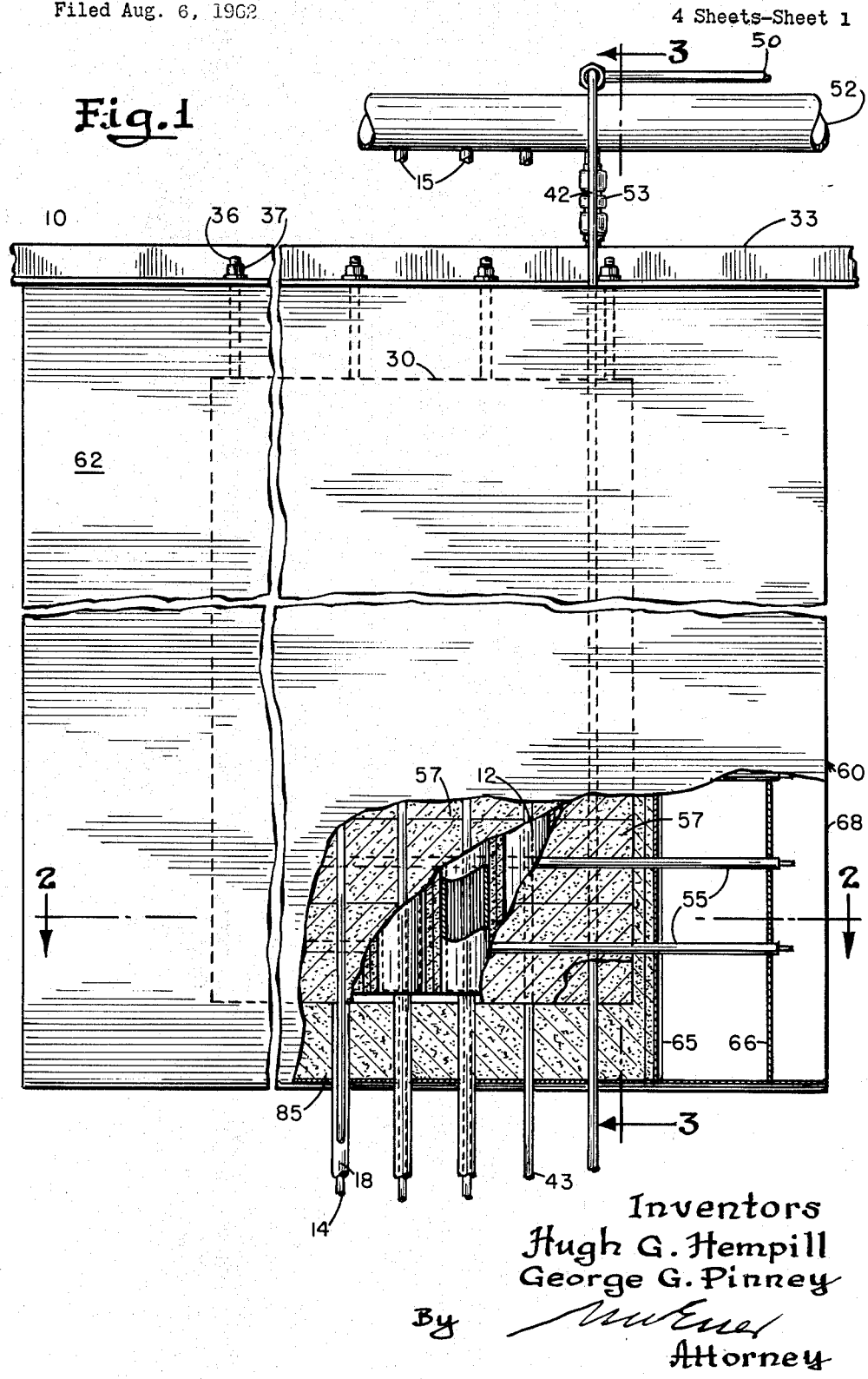

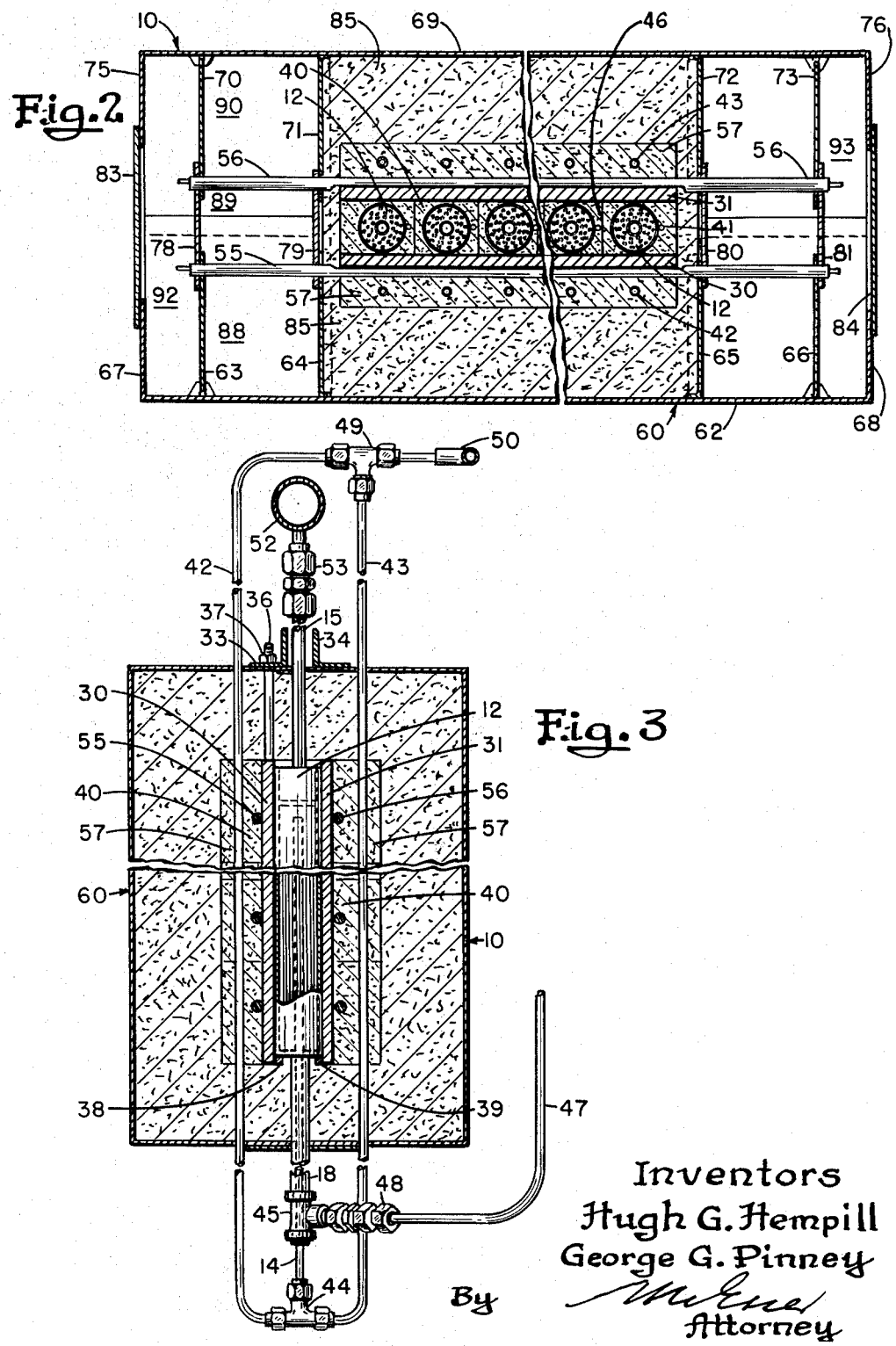

Inventors
Hugh G. Hempill
George G. Pinney
By
Attorney

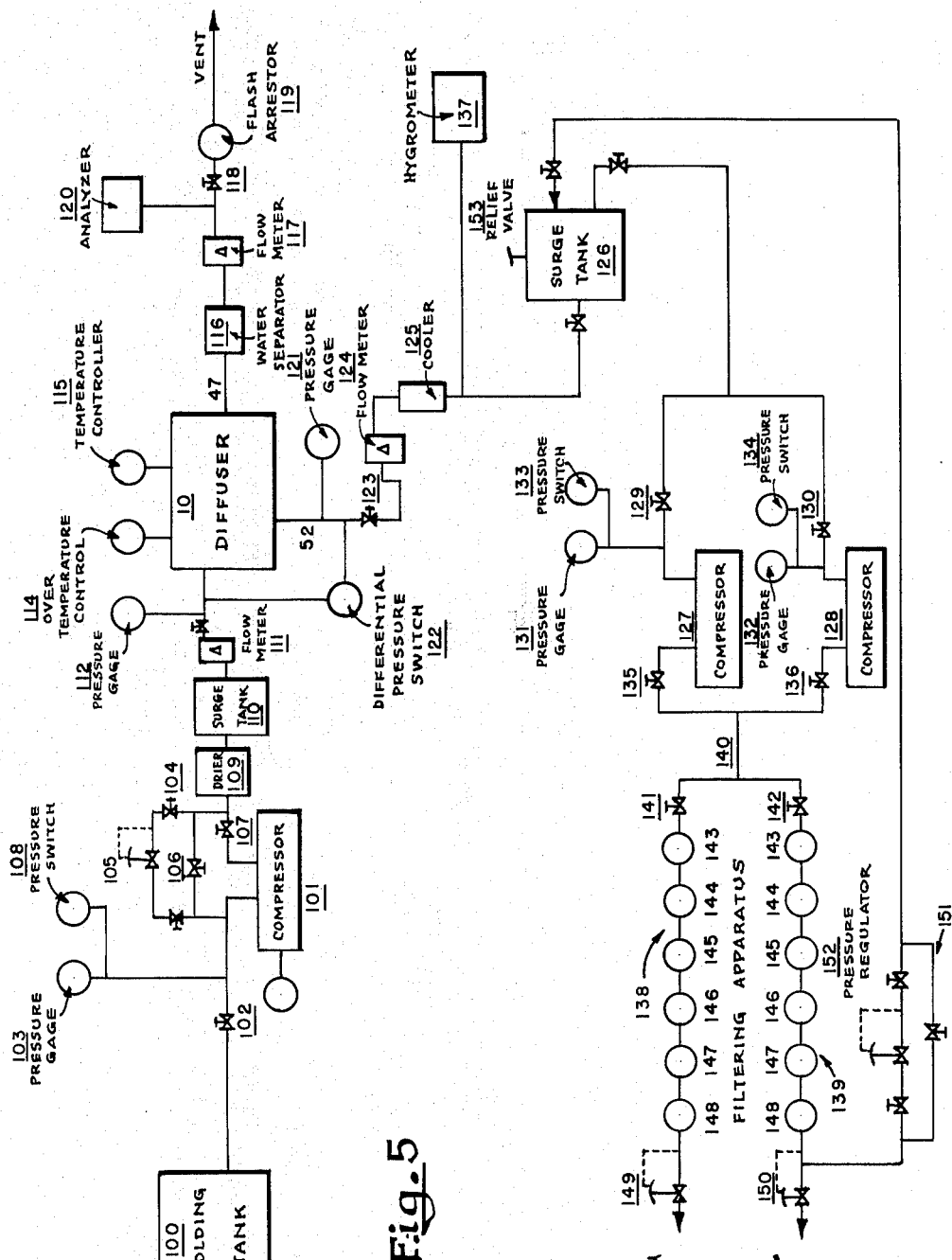

United States Patent Office 3,226,915
Patented Jan. 4, 1966

3,226,915
HYDROGEN DIFFUSION UNIT
George G. Pinney, Park Ridge, and Hugh G. Hempill, Chicago, Ill., assignors to Chemetron Corporation, Chicago, Ill., a corporation of Delaware
Filed Aug. 6, 1962, Ser. No. 214,958
5 Claims. (Cl. 55—158)

This invention relates to a device for manufacturing high purity hydrogen. More particularly, the present invention is concerned with a furnace structure for producing high purity hydrogen in large commercial volumes by a diffusion method.

It is known that only pure hydrogen gas will pass through a palladium or a silver palladium alloy having a relatively small thickness. A wall thickness of about 3 mils has been found to work best. The palladium metal therefore affords a unique method for filtering out all materials foreign to hydrogen gas. In normal operations the palladium takes the form of a capillary like tube around which raw or impure hydrogen is introduced in a temperature range of about 500–700° F. and under pressure. One end of the tube which is in contact with the impure hydrogen is sealed off and the other open end is in communication with a separate compartment. All foreign materials cannot pass through the palladium tube while pure hydrogen will. While such a procedure results in hydrogen having a high degree of purity it is highly desirable to have a device which will effect the advantages of the palladium diffusion technique and will additionally produce pure hydrogen in large volumes. To be commercially acceptable an apparatus for producing uncontaminated hydrogen must not only have a large output but it must be economical and safe to operate. This latter factor can well be appreciated where hydrogen gas is being produced. A commercially acceptable apparatus must also be simple in its design and construction while operating at the highest degree of efficiency.

It is therefore an object of the present invention to provide an apparatus for producing high purity hydrogen on a commmercial scale.

It is also an object of this invention to provide a furnace structure for producing large volumes of pure hydrogen which is simple in its design but efficient in its operation.

It is another object of the present invention to provide a novel device for hydrogen purification which is completely safe to operate while treating large quantities of hydrogen.

It is still another object of the present invention to provide a novel heat exchange means for a hydrogen diffusion operation.

These and other objects of this invention will become more apparent as the following description proceeds when taken in conjunction with the accompanying drawings in which:

FIGURE 1 is a view in side elevation and also showing various vertical sectional views of the present device.

FIGURE 2 is a horizontal sectional view taken along line 2—2 of FIGURE 1.

FIGURE 3 is a view in vertical section taken along line 3—3 of FIGURE 1.

FIGURE 5 is a flow diagram depicting the operation of the present device.

Figure 4:
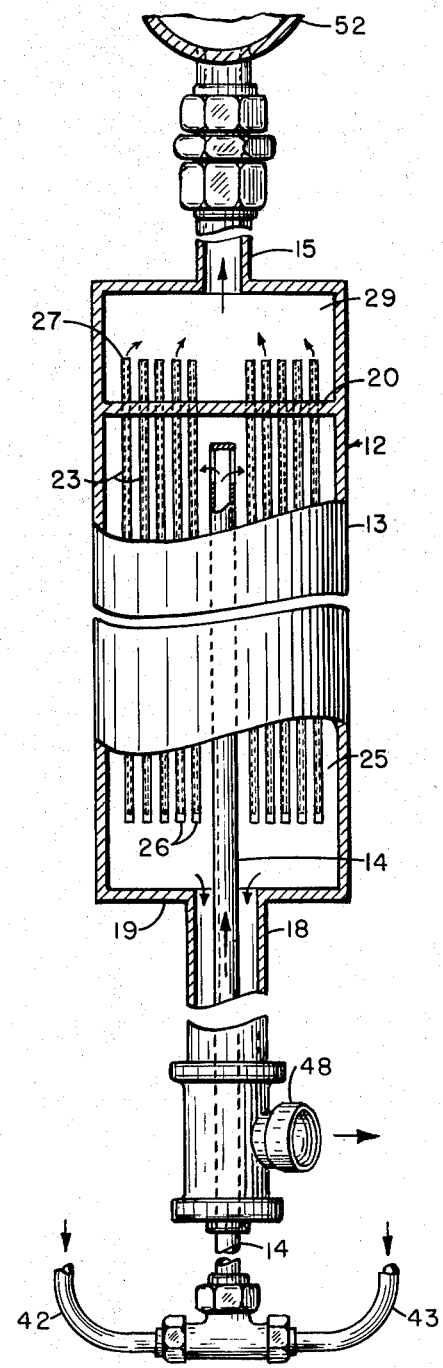
FIGURE 4 is side elevational view partially in vertical shown in FIGURES 1–4, has an overall rectrangular apparatus of FIGURE 1.

The novel apparatus 10 of the present invention, as shown in FIGURES 1–4, has an overall rectangular appearance. Positioned in the center of apparatus 10 are a plurality of hydrogen diffusion cells 12. Referring specifically to FIGURE 4 it will be seen that each cell unit has a tubular body section 13 with a hydrogen inlet tube 14 at one end and a hydrogen outlet tube 15 at the opposite end. Tubes 14 and 15 are positioned in coaxial alignment with each other and tube 14 is further disposed concentrically inside vent tube 18 which terminates in end wall 19 of body section 13. Inlet tube 14 terminates a short distance from partition wall 20 which also serves to secure a plurality of palladium alloy tubes 23 in substantially parallel alignment within body section 13. Tubes 23 are capillary like in nature having an outside diameter of about ⅟₁₆ inch and a wall thickness of about 3 mils. It will be noted that the major portion of tubes 23 extend into compartment 25 which serves as the inlet compartment for raw or impure hydrogen and an outlet compartment for all foreign material. Tubes 23 terminate a short distance away from wall 19 and are closed at ends 26 adjacent thereto. The opposite ends 27 of the tubes are in open communication with compartment 29 leading to outlet 15.

Cell units 12 are equidistantly spaced apart in substantially linear and parallel alignment. Two metallic plate members 30 and 31 having a width slightly less than the diameter of the cells are placed in direct contact with cells 12 and on opposite sides thereof. Plates 30 and 31 are vertically supported by means of beams 33 and 34, respectively, which in turn are supported in an elevated manner by suitable supports (not shown). Studs 36 with nuts 37 provide the necessary attachment for plates 30, 31 to beams 33, 34, respectively. Each cell unit 12 while contacting plates 30 and 31 is supported in a substantial vertical manner by flange portions 38 and 39 secured at the bottom of respective plates 30 and 31. It will be noted that plates 30 and 31 contact cells 12 along the entire length of body section 13.

A thermoconductive material 40 is placed completely around and over all of the body sections 13 of cells 12 as well as the portions of the cells adjacent plates 30 and 31. Vent holes 41 are provided through material 40 at the top of cells 12 to allow any gas leaking from cells 12 to escape. Material 40 is of plastic like consistency at room temperature but hardens irreversibly at higher temperatures such as 600° F. whereat the present unit operates most efficiently. It is sold under the trade name Thermon Cement Grade T-63 by the Thermon Manufacturing Company, of Houston, Texas, and is a mixture of silicates and carbon. Thin sheets of aluminum foil 46 are placed equidistantly between the cells prior to packing with the plastic cement. This presents a nonadhering surface for the cement and makes each cell separable for repair or replacement purposes.

On opposite sides of each cell 12 but to the outside of plates 30 and 31 are two hydrogen inlet conduits 42 and 43 which extend in a spaced longitudinal manner with respect to the plates and are coextensive therewith. Conduits 42 and 43 meet beneath each cell 12 in a T arrangement 44 where they join single hydrogen inlet tube 14. As previously stated tube 14 is concentrically located within vent tube 18 which like inlet tube 14 joins T, 45. A further section of a vent tube 47 attaches to T, 45 by means of a reducing fitting 48. At the top of cell units 12 hydrogen inlet conduits are fed by a common line 50 with the proper connection being made through another T designated 49. A common header or outlet manifold 52 is positioned alongside line 50 and interconnects hydrogen outlet tubes 15 by means of fittings 53.

Secured to the outside of plates 30 and 31 by means of brackets (not shown) are a series of heating elements 55 and 56. They are equally spaced along the entire length of plates 30 and 31, and consequently cells 12, as well as hydrogen inlet conduits 42 and 43. The same type of thermoconductive plastic material designed by numeral 40 and here preferred to as 57 is applied to the outside of plates 30 and around inlet conduits 42 and 43. This affords optimum pre-heating of the hydrogen gas before it enters cell units 12.

Shell member 60 completely surrounds heating elements 55 and 56 and serves as an enclosure for unit 10. It is fabricated in two sections, with side walls 62, cross panels 63–66 and end walls 67 and 68 forming one part, while side wall 69, cross panels 70–73 and end panels 75 and 76 form the other part. Heating elements 55 and 56 are accommodated through panels 63–66 and 70–73 as well as central panels 78–81 and thereby support shell member 60. Exterior central panels 83 and 84 connect end panels 67, 75 and 68, 76, respectively, to complete the enclosure.

Referring specifically to FIGURE 2 it will be noted that an insulating material 85 of the diatomaceous earth type is placed around heat conductive material 57 between panels 64, 79 and 71 on one side and panels 65, 80 and 72 on the other side. Between panels 63 and 64, 78 and 79, 70 and 71 are compartments 88–90 containing only air to serve as a cooling zone for heating elements 55 and 56 so that the proper electrical connections can be made without the heat retained by the insulation 85 damaging such. The same arrangement prevails at the other end of the unit. Appropriate electrical connections are made with elements 55 and 56 between panels 83 and 78 as well as 80 and 81 wherein still other compartments 92 and 93 respectively are formed.

While any suitable system for energizing the elements from an electric power source can be employed, the preferred manner is to interconnect the elements in a 440 voltage system with a balanced 3 phase system. The elements are wired together in parallel, in groups of five elements in a delta fashion. A 220 voltage can instead be used if desired.

A better understanding of the present novel apparatus as well as its advantages will be seen by an explanation of its operation. Referring to the flow diagram depicted in FIGURE 5 it will be seen that diffusing unit 10 is supplied with impure hydrogen by means of a holding tank 100 containing raw or impure hydrogen at low pressure. The raw hydrogen should contain virtually no halogens or sulfur since these materials are damaging to palladium tubes 23. Small amounts of oxygen can be tolerated but should not be much in excess of 1%. The hydrogen feeds a compressor 101, through shut off valve 102, which compresses the hydrogen to a pressure of about 200 p.s.i. The compressor suction pressure measured by gage 103, is prevented from dropping below atmospheric pressure by pressure switch 108. This pressure switch shuts off the driving motor of compressor 101 when the pressure drops to slightly above 1 atmosphere. A recycling system 104 maintains a fixed discharge of hydrogen at about 200 p.s.i. by means of upstream pressure regulator 105 and manual control valve 106. The hydrogen leaving the compressor passes through shut off valve 107, passes through a caustic potash drier 109 and into a surge tank 110. From surge tank 110 the hydrogen passes through a multiplicity of flow meters represented by 111 for each of cell units 12. The pressure of the hydrogen is subsequently measured by pressure gage 112. A temperature controller 114 measures and controls the temperature of the heating elements 55, 56 at about 600° F. for normal operation and shuts off power to the elements should they become overheated for reasons such as the failure of temperature control 115 which measures and controls the temperature of the pure hydrogen in header 52. The vented impurities leave through vent pipe 47 and pass through water separator 116, flow meter 117 and a flash arrestor 119 to prevent any fires in diffuser furnace 10 caused by an inadvertent ignition. The hydrogen content of the vented impurities as measured by analyzer 120 is kept to a minimum consistent with proper operation of apparatus 10. If too much hydrogen is being expelled valve 118 is regulated to reduce flow rate and consequently diffusion rate in cells 12. The pressure of the purified hydrogen in header 52 is measured by pressure gage 121 at the same time the pressure differential across cells 12 which should be about 200 p.s.i., is controlled by differential pressure switch 122. This pressure switch will shut off the driving motor of compressor 101 before the differential pressure becomes so high as to damage tubes 23.

The pure hydrogen leaving furnace 10 passes through valve 123, flow meter 124, and water cooler 125 into surge tank 126. The moisture content of the hydrogen leaving cooler 125 is measured by hygrometer 137. Any moisture in excess of 1 p.p.m. would be an indication of leakage of impurities into the purified hydrogen. Pure hydrogen leaving tank 126 enters compressors 127, 128 through valves 129, 130 respectively. The suction pressure of these compressors is measured by gages 131 and 132, respectively. Pressure switches 133, 134 shut off the driving motors of compressors 127, 128 if their suction pressures should approach 1 atmosphere. Pure hydrogen ladened with oil mist and oil vapors resulting from the lubrication of compressors 127, 128 passes through valves 135, 136, respectively, and enters the filtering apparatus 138 and 139 through a common header 140.

Further purification of the hydrogen takes place as the gas moves through valves 141, 142 and into the filtering apparatus to remove all oil vapor, oil mist and any moisture. Suitable standard mechanical filters and chemical adsorbents are employed. A typical arrangement is an entrainment separator 143, refrigerator 144, high efficiency mechanical filter 145, activated alumina 146, synthetic zeolite 147 and activated carbon 148. This arrangement will remove all but about 5 p.p.m. of impurities entering after the diffusion operation.

Hydrogen leaving the filtering apparatus passes through upstream pressure regulators 149, 150 which maintain a high pressure on the filter apparatus to assure efficient operation. All of the hydrogen leaving filtering apparatus 138 through regulator 149 is discharged into appropriate containers such as high pressure cylinders for marketing. A portion of the hydrogen leaving filtering apparatus 139 passes through upstream pressure regulator 150 and is discharged into the previously mentioned containers. The remainder of the pure hydrogen passes through recycling apparatus 151 and into surge tank 126. The amount of hydrogen so recycled is controlled by downstream regulator 152 which maintains a positive pressure on surge tank 126. Tank 126 also has a relief valve 153 which vents all hydrogen entering the tank in excess of that required by compressors 127 and 128.

The previously referred to flow and control system for apparatus 10 maintains the necessary pressure drop of about 200 p.s.i. over the cell units 12 and also the requisite temperature of about 600° F. in conjunction with a continuous operation. With respect to the temperature of the hydrogen being fed to the cells, the present electric furnace assures complete heating of the raw hydrogen by having the incoming conduits 42 and 43 in contact with heating elements 55 and 56 through conductive material 57. Concerning the flow of the heated hydrogen into cells 12, it will be seen from the drawings that the cells are supported in a vertical manner so that pure hydrogen leaves the top of cell 12 through conduit 15. The hydrogen inlet tube 14 then enters cell 12 from the bottom and discharges the raw hydrogen in the bottom portion of the cell beneath hydrogen outlet compartment 29. This arrangement affords maximum efficiency of the cell unit since pure hydrogen gas will accumulate and remain near the top of vent compartment 25 and away from vent tube 18.

A plastic like thermoconductive material 40 and 57 has been described for packing between plates 30 and 31 cells 12, as well as around hydrogen inlet conduits 42 and 43. If desired, other heat transferable material could be employed of the refractory type such as a ceramic or bricklike material. Obviously any type of insulating material could be substituted for insulation 85 so long as it will withstand operating temperatures. Examples of these are fiber glass, rock wool, etc. They should, however, be in the powdered form. All tubes and conduits for handling hydrogen such as manifold 50, inlets 42, 43, 14 and outlet 15, should be composed with a stainless steel or high nickel alloy contacting surface.

It will thus be seen that through the present invention there is provided a novel heat exchange apparatus for hydrogen diffusion which affords maximum heat conductively at temperatures ranging from 500 to 1000° F. The present apparatus is absolutely safe with the possibility of explosion virtually eliminated. Pure hydrogen is at all times produced and no chance of human error can enter into the operation. If for example, the heat is not turned on, no hydrogen will diffuse and if no hydrogen is delivered to the diffusion cell no adverse consequences will occur. Further, maximum efficiency is at all times provided with negligible loss of hydrogen. The present apparatus is also very simple in design and compact in its construction occupying a very limited area.

While one specific and preferred form of the hydrogen diffusion apparatus has been illustrated and described, it will be understood that other forms will be suggested to those skilled in the art and that it is intended to include all such that do not depart from the spirit of this invention within its scope as best defined in the appended claims.

We claim:
1. An apparatus for the commercial and continuous production of high purity hydrogen comprising a plurality of hydrogen diffusion cells in substantial linear and parallel alignment, each said cell provided with raw, untreated gaseous mixture of hydrogen and foreign material inlet and diffused gaseous hydrogen outlet means and an outlet for non-diffused foreign gaseous material, each said cell containing a plurality of palladium diffusion tubes having one end thereof open and one end thereof closed, said tubes constructed and arranged in their respective cell with said open end in open fluid communication with only said diffused gaseous hydrogen outlet means but in closed communication with said untreated gaseous mixture inlet means and said outlet means for non-diffused foreign gaseous material, means constructed and arranged in each said cell to support said diffusion tubes and prevent the flow of gases to said diffused gaseous hydrogen outlet means other than through said palladium diffusion tubes, a pair of metallic plate members positioned outside of and on opposite sides of said cells and in direct physical and thermal contact therewith, heating elements in direct physical and thermal contact with each said plate on the side of said plate opposite said cells, at least one untreated gaseous mixture inlet conduit spaced from one of said plates on the side of said plate opposite said cells, a thermoconductive material filling the space between said plate member and said untreated gaseous mixture inlet conduit, said thermoconductive material also disposed around and in direct physical and thermal contact with said untreated gaseous mixture inlet conduit so that said thermoconductive material encompasses said untreated gaseous mixture inlet conduit and said thermoconductive material has a first surface contacting said plates and a second surface opposite said plates and not contacting said plates, the entire volume defined by the exterior of the cells and said plate members filled with a thermoconductive material, a common outlet manifold joining each said diffused gaseous hydrogen outlet means, means to introduce untreated gaseous mixture under pressure to said untreated gaseous mixture inlet and insulation means in direct physical and thermal contact with said second surface of said thermoconductive material as well as any surface of said plate member not contacted by said cells, said thermoconductive material and said heating elements.

2. The apparatus as defined in claim 1 wherein said metallic plate members are substantially coextensive with said plurality of cells and said heating elements are spaced to provide heat over the entire area of said metallic plates.

3. The apparatus as defined in claim 2 wherein each said cell is provided with two untreated gaseous mixture inlet conduits at least coextensive with said plates.

4. The apparatus as defined in claim 1 including means disposed between each said cell and its next adjacent cell presenting a nonadhering surface for the thermoconductive material so that each said cell is separable for repair and replacement.

5. The apparatus as defined in claim 4 wherein said means for separating said cells is a sheet of aluminum foil placed between each cell and its next adjacent cell.

References Cited by the Examiner

UNITED STATES PATENTS

| | | | |
|---|---|---|---|
| 1,174,631 | 3/1916 | Snelling | 55—16 |
| 2,095,807 | 10/1937 | Gier | 55—158 XR |
| 2,400,940 | 6/1946 | McCollum | 55—158 XR |
| 2,422,882 | 6/1947 | Bramley | 55—16 XR |
| 2,456,163 | 12/1948 | Watson | 55—158 XR |
| 2,609,059 | 9/1952 | Benedict | 55—16 |
| 2,671,336 | 3/1954 | Hulsberg | 55—158 XR |
| 2,671,337 | 3/1954 | Hulsberg | 55—158 XR |
| 2,773,561 | 12/1956 | Hunter | 55—16 |
| 2,824,620 | 2/1958 | De Rosset | 55—16 |
| 2,892,508 | 6/1959 | Kohman et al. | 55—16 |
| 2,911,057 | 11/1959 | Green et al. | 55—16 |
| 2,958,391 | 11/1960 | De Rosset | 55—16 |
| 2,962,123 | 11/1960 | Darling | 55—16 |
| 3,019,853 | 2/1962 | Kohman et al. | 55—386 |
| 3,022,858 | 2/1962 | Tillyer et al. | 55—158 XR |
| 3,062,037 | 11/1962 | Donner et al. | |

FOREIGN PATENTS

| | | |
|---|---|---|
| 776,641 | 6/1957 | Great Britain. |
| 795,210 | 5/1958 | Great Britain. |
| 604,396 | 5/1960 | Italy. |

REUBEN FRIEDMAN, *Primary Examiner.*

UNITED STATES PATENT OFFICE
CERTIFICATE OF CORRECTION

Patent No. 3,226,915 January 4, 1966

George G. Pinney et al.

It is hereby certified that error appears in the above numbered patent requiring correction and that the said Letters Patent should read as corrected below.

Column 1, lines 63 and 64, for "shown in FIGURES 1-4, has an overall rectangular apparatus of FIGURE 1" read -- section of a diffusion cell which is employed in the apparatus of FIGURE 1 --; column 2, line 71, for "preferred" read -- referred --.

Signed and sealed this 13th day of December 1966.

(SEAL)
Attest:

ERNEST W. SWIDER
Attesting Officer

EDWARD J. BRENNER
Commissioner of Patents